United States Patent [19]

Hitzel

[11] Patent Number: 4,481,112
[45] Date of Patent: Nov. 6, 1984

[54] PROCESS OF TREATING GAS CONDENSATE

[75] Inventor: Hans Hitzel, Dietzenbach, Fed. Rep. of Germany

[73] Assignee: Hans Hitzel, Inc., Fed. Rep. of Germany

[21] Appl. No.: 517,880

[22] Filed: Jul. 27, 1983

[30] Foreign Application Priority Data

Aug. 4, 1982 [DE] Fed. Rep. of Germany ....... 3229019

[51] Int. Cl.$^3$ .............................................. C02F 9/00
[52] U.S. Cl. .................................. 210/620; 210/631; 210/669; 210/674; 210/685; 210/903; 210/915
[58] Field of Search ............... 210/669, 674, 685, 620, 210/631, 903, 915

[56] References Cited

U.S. PATENT DOCUMENTS

| | | | |
|---|---|---|---|
| 3,408,289 | 10/1968 | Gustafson | 210/669 |
| 4,051,079 | 9/1977 | Melby | 210/674 |
| 4,246,101 | 1/1981 | Selby | 210/669 |
| 4,372,858 | 2/1983 | Ritter | 210/674 |

*Primary Examiner*—Ivars Cintins
*Attorney, Agent, or Firm*—Sprung, Horn, Kramer & Woods

[57] ABSTRACT

The sewage consists of gas condensates from coal-gasifying plants and/or coal chemical plants and contains the anions $SO_4^{--}$, $SCN^-$, $NO_3^-$, $Cl^-$ and $F^-$ in a total of at least 2 mval/l and contains organic matter corresponding to a chemical oxygen demand of at least 1000 mg/l. The sewage is passed through a biological purification stage (8), and a succeeding fine purification stage (13, 17, 18). In an anion exchanger (19), strong anions are exchanged with hydrogen carbonate ions. The water leaving the anion exchange stage has an alkalinity of at least 2 mval/l and is passed at least in part through a cation exchanger (26) before the water is recycled to the sewage (line 5).

The water which has left the anion exchanger (19) may be used as cooling water in a cooling tower (21) before or after the cation exchanger (26). Organic acids are used for regeneration in the cation exchanger (26) and the regeneration eluate is added to the sewage which is to be treated in the biological purification stage (8).

2 Claims, 1 Drawing Figure

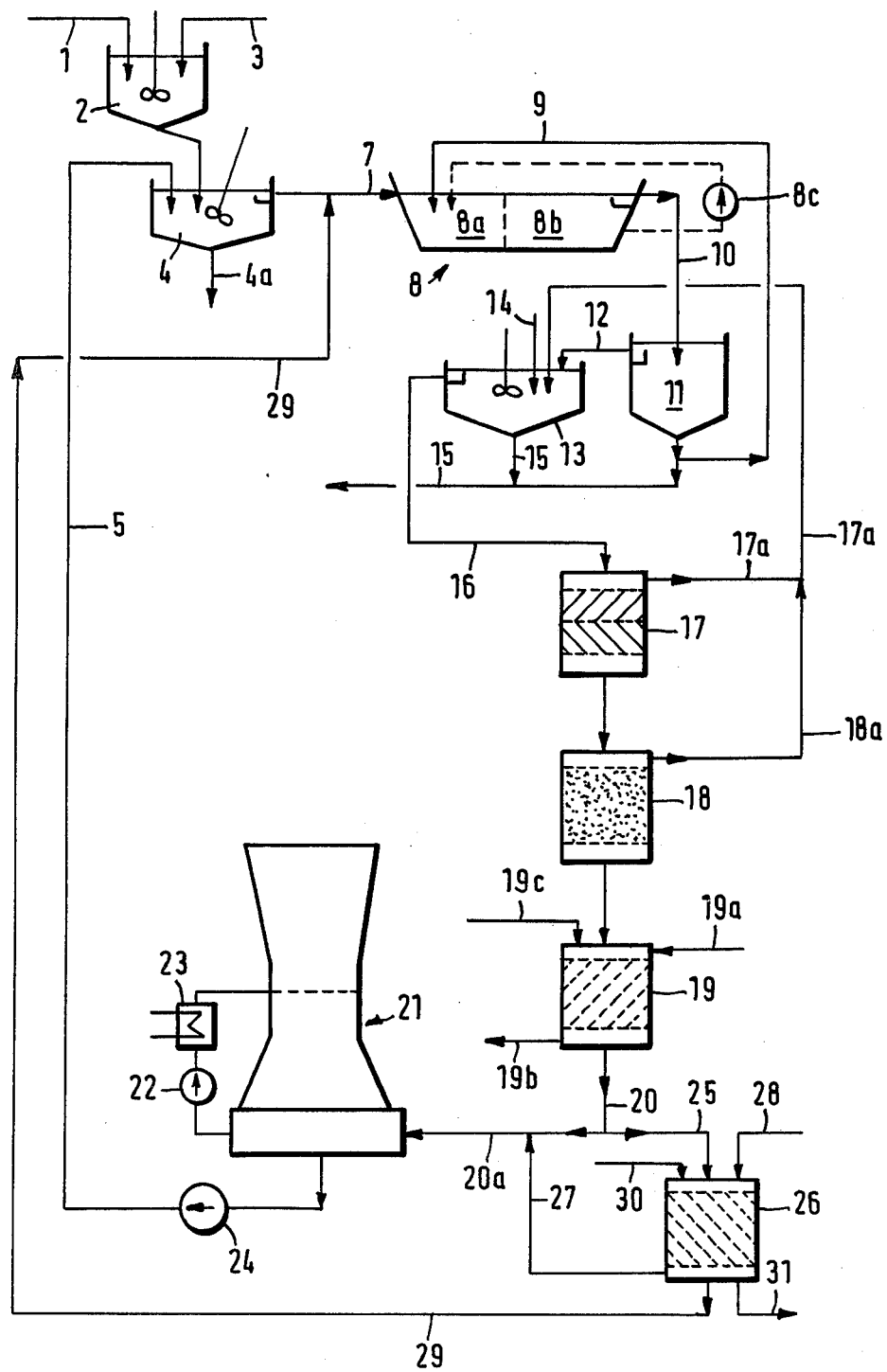

PROCESS OF TREATING GAS CONDENSATE

BACKGROUND OF THE INVENTION

1. Field of the Invention

This invention relates to a process of treating sewage, particularly gas condensates from coal-gasifying plants and/or coal chemical plants, which sewage has a total content of at least 2 mval/l of the anions $SO_4^{--}$, $SCN^-$, $NO_3^-$, $Cl^-$ and $F^-$ and contains organic matter in an amount corresponding to a chemical oxygen demand (COD) of at least 1000 mg/l, wherein the sewage is passed thrugh a biological purification stage and a succeeding fine purification stage, strong anions are exchanged in an anion exchanger with hydrogen carbonate ions, and at least part of the treated water is added to the sewage before the biological purification stage.

Such process has been described in Laid-open German Application No. 31 09 848 and is further developed here.

In the conversion of coal and silimar fuels, e.g., by gasification, a highly soiled sewage becomes available, which contains components of the product gas produced by the gasification. The sewage which contains a condensate of the product gas is passed through a plurality of coarse purification stages to remove tars, oils, phenols, acid gases and ammonia. Such treatment has been described in Chemical Engineering Progress, volume 71, No. 6 (1975) on pages 99 to 104. In that treatment, large proportions of the phenols are removed, e.g., by liquid-liquid extraction. Ammonia can be removed in part by stripping with vapor. However, after such coarse purification, the sewage still contains various disturbing components, such as sulfate, thiocyanate, chlorine, fluorine and nitrate ions as well as free $NH_3$ and ammonium ions and organic impurities so that the sewage must not be directly discarded into a receiving body of water and cannot be used further, e.g., as cooling water. For this reason the sewage is then purified biologically and subsequently subjected to a fine purification. Strong anions ($SO_4^{--}$, $NO_3^-$, $Cl^-$, $F^-$) are exchanged with hydrogen carbonate ions in an anion exchange stage, and at least part of the treated water is recycled to a point preceding the biological purification stage. In that process the treated water, which contains $CO_3/HCO_3$ ions, effects a compensation of the cation deficiency and a stabilization of the pH value in the biological purification stage.

Alkali ions are supplied to the system with the sewage. The treatment in the biological purification zone preferably includes nitrification and denitrification and without the above-mentioned recycling of alkali ions would result in a cation deficiency. This is mainly due to the fact that nitrogen is taken up by the cell material of the microorganisms and that ammonia is converted to nitrite and nitrate by biological oxidation. This results in a strong decrease of the pH value. Whereas this could be opposed, e.g., by an addition of $Ca(OH)_2$ in order to avoid a disturbance of the biological processes, high concentrations of calcium would be disturbing in the further use as cooling water and would have to be prevented at a high expenditure. The addition of other foreign substances, such as sodium carbonate, is also expensive and they must be removed if the water is to be re-used. These disadvantages are avoided by the exchange of anions and by the recycling of the treated sewage. In this manner the pH value in the biological purification stage is maintained in the favorable range of about 6 to 8.

Owing to its circulation, the treated water which is recycled to the sewage is enriched with strong cations, namely, $Na^-$, $K^-$, $Ca^-$ and/or $Mg^-$ ions. The strong anions are removed at least in part in the anion exchanger. This may result in the system in an excessive surplus of free alkali, which disturbs the exchange of strong ions with (alkaline) hydrogen carbonate ions in the anion exchanger, which preferably contains a slightly basic anion exchange material. In that anion exchange, the existing alkali competes with the alkali which is to be formed.

For this reason it is an object of the invention to avoid in the process described first hereinbefore a disturbingly high surplus of free alkali in the water. This is accomplished in accordance with the invention in that water which has left the anion exchanger and has an alkalinity of at least 2 mval/l is treated in a cation exchange stage to remove at least part of the free alkali from the water before the latter is recycled to the sewage.

Because the free alkali must be removed only to a remainder of about 2 mval/l, it is sufficient in most cases to pass only a partial stream of the water through the cation exchanger.

If the treated water is to be used as cooling water in a cooling tower, it is desirable to remove the surplus free alkali before because a high alkalinity of cooling water gives rise to certain difficulties in the conditioning of the cooling water, e.g., when chlorine is used as a biocide. Moreover, the salt concentration in cooling water must be limited regardless of the kind of said salts.

The surplus free alkali is preferably removed by means of a slightly acid cation exchange material which is in the hydrogen form. Organic acids such as become available as sewage in the reaction water of hydrocarbon synthesis may be used to regenerate the cation exchange material. The regeneration eluate may also be supplied to the sewage before the biological purification and may be biologically decomposed. If mineral acids are used as regenerating liquor, the salts corresponding to said acids will be contained in the regeneration eluate so that said eluate must not be supplied to the system. If the cation exchange material is regenerated by means of organic acids, preferably fatty acids having a dissociation constant in excess of $10^{-5}$ are employed. The regeneration eluate is recycled to the biological processing stage, the alkali ions are not lost and are desirably available for effecting a neutralization in the biological purification stage. On the other hand, the water which has been treated by a cation exchange will have a correspondingly lower alkalinity, as is desirable for cooling water for use in a cooling tower. If alkali ions are to be removed from the system, the use of mineral acids for regenerating the cation exchange material and the discarding of the regeneration eluate is recommended.

An advantage afforded by the removal of surplus free alkali by a cation exchange resides in that any desired alkalinity in the effluent of the anion exchange stage can be adjusted so that the salt content will be reduced accordingly. Another advantage resides in that ammonium ions can also be removed in part in this manner.

BRIEF DESCRIPTION OF DRAWINGS

The annexed drawing is a flow diagram showing one mode for carrying out the process of the invention.

DESCRIPTION OF SPECIFIC EMBODIMENT

An example of the process is illustrated in the drawing.

A sewage which has been coarsely purified to remove tar, oil, phenols, acid gases and ammonia is supplied in line 1 to a precipitation tank 2, which is supplied with Ca(OH)$_2$ through line 3 so that part of the fluoride contained in the sewage is precipitated as CaF$_2$. The mixture is supplied to the precipitation tank 4 together with treated water, which is supplied through line 5 and contains CO$_3$/HCO$_3$ ions in a proportion corresponding to an alkalinity of at least 5 mval/l. Precipitated calcium carbonate and calcium fluoride are withdrawn from the tank 4 as sludge through line 4a. The precipitate sludge in line 4a contains about 40% of the fluorine ions which were contained in the sewage in line 1. Part of the sludge in line 4a is suitably recycled to the tank 4 and used as contacting sludge. This is not shown on the drawing.

The weakly acid cation exchange material which has been used in the cation exchanger 26 is regenerated with organic acids. The acid regeneration eluate from line 29 is admixed to the sewage which has left the tank 4 in line 7. The sewage is subsequently fed to the biological processing stage 8, which is also supplied with recycled sludge from line 9. It is known that the processing stage 8 must be supplied with air or oxygen-enriched gas. This is not shown on the drawing for the sake of simplicity. The entrance zone 8a of the biological processing stage 8 is operated as a denitrification zone. In the exit region 8b, the biological decomposition of the organic matter is continued and nitrification is effected. By a pump 8c, nitrified water from zone 8b is internally recycled to the denitrification zone 8a through a conduit indicated by a dotted line. The sewage which has been biologically processed flows in line 10 into a secondary clarification basin 11, from which sludge is withdrawn and recycled through line 9.

The sewage which has been biologically purified is supplied through line 12 to a flocculation tank 13, which is supplied through line 14 with flocculating agent and, if desired, a flocculation-promoting agent. The floc sludge together with the surplus sludge withdrawn from the basin 11 through line 9 is withdrawn through line 15. The sludge from the flocculation tank is desirably also recycled. This is not shown on the drawing.

The sewage which has benn biologically purified is supplied through line 12 to a flocculation tank 13, which is supplied through line 14 with flocculating agent and, if desired, a flocculation-promoting agent. The floc sludge together with the surplus sludge withdrawn from the basin 11 through line 9 is withdrawn through line 15. The sludge from the flocculation tank is desirably also recycled. This is not shown on the drawing.

The sewage is then supplied in line 16 to a two-bed filter 17 and is subjected to an adsorption treatment in an activated carbon filter 18. The water used to rinse these two filters 17 and 18 is supplied to the flocculation tank 13 through lines 17a and 18a, respectively.

The water from the activated carbon filter 18 is passed through an anion exchanger 19. The water entering that exchanger contains fluorine ions not in excess of 100 mg/l and has a chemical oxygen demand (COD) not in excess of 200 mg/l. In the exchanger 19, strong anions, namely, fluorine, chlorine, nitrite and sulfate ions, are exchanged with HCO$_3$ ions.

Weakly basic anion exchange materials having a high selectivity at least for chlorine ions are suitably employed to exchange strong anions with hydrogen carbonate. A commercially available anion exchange material sold by Rohm & Haas under the designation IRA-68 can preferably be used. Suitable ion exchange materials have been described in U.S. Pat. No. 3,156,644 and in Ind. Eng. Chem., Process Res. & Dev. (1964), Vol. 3, page 404. As the selectivity of the weakly basic anion exchange materials which are usually employed is not particularly favorable for an exchange of fluorine ions with HCO$_3$ ions, the biological purification will preferably be preceded by a precipitation of CaF$_2$ with Ca(OH)$_2$ in the tank 2 if the sewage contains fluorine ions in a substantial concentration, e.g., in excess of 50 mg/l. The treated water in line 5 is desirably added to the sewage after the precipitation of CaF$_2$ because the surplus of the hydrate of lime which has been used to precipitate CAF$_2$ will then be precipitated as CaCO$_3$ and can be removed. As a result, the concentration of Ca ions, which would be disturbing at other points, can be kept at a low value.

When th anion exchange material in the exchanger 19 has been exhausted, that material is treated with ammonia solution, which is supplied in line 19a. The regeneration eluate, which contains the strong anions which have been exchanged, is withdrawn in line 19b. Ammonia is recovered from that regeneration eluate in a manner which is not shown. Before the anion exchange material is re-used, it is transformed to the HCO$_3$ form by a treatment with CO$_2$ from line 19c.

The water withdrawn from the anion exchanger 19 is desirably used as cooling water in a cooling tower 21. In that manner, sewage can be eliminated by evaporation and fresh water for cooling purposes can be saved. The evaporation in the cooling tower results in a corresponding increase of the concentration of CO$_3$/HCO$_3$ ions in the water which is admixed to the sewage before the biological purification. Owing to the contents of alkali carbonate and hydrogen carbonate, a reduction of the pH-valve during the nitrification of ammonia in the cooling system will be avoided.

In order to ensure that the water supplied to the cooling tower 21 has a low alkalinity not in excess of 2 to 3 mval/l, a partial stream of the water withdrawn from the plant 19 is branched in line 25 and passed through a cation exchanger 26. The exchanger 26 usually contains a weakly acid cation exchange material in the hydrogen form. Owing to the selectivity of the cation exchange material, bivalent cation, Ca and Mg ions, are preferentially exchanged but Na, K, and NH$_4$ ions are exchanged too. This results in a reduction of the salt content and of the hardness of the water. The thus treated water is added through line 27 to the untreated water in line 20. The resulting mixed waters are used as cooling water in the cooling tower 21.

In the cooling tower 21, the water is passed by means of the pump 22 through the cooler 23 and is caused to trickle in the tower. Part of the water is evaporated and the vapors leave the cooling tower 21 at its top.

Part of the blow down, which is the water being circulated, is fed by the pump 24 to the line 5 of the sewage treating plant.

When the weakly acid cation exchange material of the exchanger 26 has been exhausted, it is treated with a solution of organic acids supplied through line 28. That solution may consist, e.g., of reaction water from the synthesis of hydrocarbons. The regeneration effluent is supplied through line 29 to the biological processing stage 8. It may be rcommendable to regenerate the cation exchange material from time to time with a mineral acid because the salts which cause hardness are eluted only in part by the relatively weak organic acids. The mineral acid is supplied through line 30 and the eluate is withdrawn from the system through line 31.

Surplus free alkali need not be removed from the water that it to be supplied to the cooling tower 21 but may alternatively be removed from the water in line 5. For this purpose the much smaller quantity of water which has been left after the evaporation in the cooling tower 21 is passed through a cation exchanger (which is not shown) and may be designed and regenerated like the exchanger 26. The treated water then flows into the tank 4, as is apparent from the drawing.

EXAMPLE

In a pilot plant corresponding to the drawing, the data compiled in the following table were measured.

The stream in line 1 is a gas liquor which has become available in the pressure gasification of coal and has been pretreated by liquid-liquid extraction and stripping with vapor. The stream in line 28 is a reaction condensate which has bcome available in a synthesis of hydrocarbons and is laden virtually only with organic matter consisting of fatty acids ($C_2$ to $C_5$). Both streams constitute the entire supply of sewage at a total rate of 160 l/h. The materials which are to be treated outside the system with $H^+$ ions. As a result, the mixed waters in line 20a have a reduced content of alkali and alkaline earth metal ions and a reduced alkalinity. Said mixed waters are partly evaporated in the cooling system 21, 22, 23 so that the stream in line 5 has a higher concentration. In the cooling system 21, 22, 23 the $NH_3$ and $NH_4^+$ contents are partly nitrified so that the water in line 5 has the measured concentrations of $NH_3/NH_4^+$ and $NO_2^-/NO_3^-$.

The cation exchange material is regenerated with the sewage which flows in line 28 and contains organic acids mainly as acetic acid. The regeneration eluate in line 29 contains the exchanged alkali ions and the alkaline earth metal ions because ythe organic acids have been used in a very high surplus (more than tenfold). That regeneration eluate is entirely supplied through line 29 to the biological purification stage.

The processing chemicals supplied comprised ammonia, which was supplied at a rate of 1148 mval/h through line 19a. 90% of that ammonia were recovered for re-use. 1148 mval $CO_2$/h were supplied through line 19c and 452 mval/h $Ca(OH)_2$ through line 3.

In the present example, there is a balance of alkali so that there is no need for a removal of surplus alkali, and the cation exchange material does not become enriched with alkaline earth metals. For this reason it is not necessary to use mineral acid, which would have to be supplied through line 30 and would result in an additional sewage stream in line 31.

TABLE

| Stream in line | 1 | 5 | 28 | 7 | 16 | 20 | 27 | 20a | 29 | 4a | 15 | 19b |
|---|---|---|---|---|---|---|---|---|---|---|---|---|
| Rate (l/h) | 120 | 40 | 40 | 199 | 197 | 190 | 100 | 190 | 40 | 1 | 2 | 7 |
| $F^-$ | 5.2 | 4.75 | 0 | 2.8 | 2.8 | 1.0 | 1.0 | 1.0 | — | 259 | 2.8 | 51.7 |
| $Cl^-$ | 1.5 | 1.42 | — | 1.2 | 1.2 | 0.3 | 0.3 | 0.3 | — | 1.2 | 1.2 | 25.3 |
| $SO_4^{--}$ | 1.0 | 1.0 | — | 1.4 | 1.4 | 0.2 | 0.2 | 0.2 | — | 1.4 | 1.4 | 33.7 |
| $SCN^-$ | 1.0 | — | — | — | — | — | — | — | — | — | — | — |
| $NO_2^-/NO_3^-$ | — | 4.2 | — | 0.85 | 1.2 | 0.3 | 0.3 | 0.3 | — | 0.85 | 1.2 | 25.3 |
| $Na^+/K^+$ | 0.5 | 15.7 | — | 6.0 | 6.0 | 6.0 | 0.9 | 3.3 | 12.8 | 6.0 | 6.0 | 6.0 |
| $Ca^{++}/Mg^{++}$ | 0.2 | 2.4 | — | 0.8 | 0.8 | 0.8 | 0.2 | 0.5 | 1.4 | 469 | 0.8 | 0.8 |
| $NH_3/NH_4^+$ | 12.0 | 2.0 | — | 7.6 | 1.0 | 1.0 | 1.0 | 1.0 | — | 8.2 | 1.0 | 165 |
| $CO_3^{--}/HCO_3^-$ | — | 8.6 | — | 4.6 | 1.2 | 6.0 | 0.3 | 3.0 | — | 210 | 1.2 | 1.2 |
| COD (mg/l) | 1500 | 145 | 12000 | 3317 | 150 | 30 | 30 | 30 | 12000 | 3317 | — | 800 |
| Organic acids | — | — | 180 | — | — | — | — | — | 180 | — | — | — |

Concentrations in mval/l unless stated otherwise consist only of the concentrated sludges and the salt-containing sewage which become available in lines 4a, 15 and 19b at a total rate of 10 l/h. Water is evaporated in the cooling tower 21 at a rate of 150 l/h.

The water withdrawn through line 12 from the secondary clarification tank 11 has a residual COD of about 200 ppm and is flocculated with 60 ppm bentonite and 5 ppm polyelectrolyte to reduce its COD to 150 ppm. The resulting water is supplied through line 16 to the two-layer filter 17 and is subsequently treated with activated carbon in the filter 18. By these treatments the COD is further reduced to about 50 ppm before the sewage is supplied to the anion exchanger 19, which contains IRA-68 from Rohm & Haas. Owing to the incomplete denitrification, the sewage in line 16 inevitably contains $NO_2^-/NO_3^-$ ions, a major part of which is also exchanged. The COD is reduced to 30 ppm by adsorption processes in the anion exchanger 19. A partial stream at a rate of 100 l/h is supplied through line 25 to the cation exchanger 26, which contains weakly acid cation exchange material in the hydrogen form. The cation exchange materal consists of IRC-84 from Rohm & Haas. In the effluent 27, potassium/sodium and calcium/magnesium have been exchanged to a large extent

What is claimed is:

1. In a process for treating gas condensate from a coal gasifying plant or a coal-based chemical plant, which condensate has a total content of at least 2 mval/l of the anions $SO_4^{--}$, $SCN^-$, $NO_3^-$, $Cl^-$ and $F^-$ and contains organic matter in an amount corresponding to a chemical oxygen demand (COD) of at least 1000 mg/l and also contains alkali metal ions and ammonium ions, which comprises the steps of:

(A) subjecting said condensate to a biological purification including nitrification at a pH value of 6 to 8 in the presence of an oxygen containing gas and a sludge in a biological treating zone, (B) subjecting the effluent from step A to clarification, fluocculation and filtration, the effluent withdrawn from said filtration having a fluoride ion content per liter of not more than 100 mg and a chemical oxygen demand of not more than 200 mg and also containing the strong anions $F^-$, $Cl^-$, $NO_3^-$ and $SO_4^{--}$, (C) subjecting said effluent withdrawn from said filtration to an anion exchange in the presence of a weakly basic anion exchanger and exchanging a predominant part of said strong anions against $HCO_3$ ions, the effluent from said anion exchanges being water containing $CO_3$ and $HCO_3$ ions, said water having an alkalinity in excess of 2 mval/l, (D) subjecting a portion of said water to a cation exchange in the presence of a weakly acid cation exchanger in hydrogen form and withdrawing a treated water from said cation exchange, (E) mixing said treated water with the water from step C not treated in said cation exchange and forming a mixed water, said mixed water having an alkalinity of 2–3 mval/l, the salt content and the hardness of said mixed water being lower than in the effluent from said anion exchange, (F) regenerating said cation exchanger by contacting the same with organic acids comprising mainly fatty acids having a dissociation constant in excess of $10^{-5}$, and producing a regenerating effluent containing alkali metal ions, feeding said regenerating effluent into the biological purification of step A, and (G) feeding said mixed water into a cooling tower, evaporating said mixed water partly in said tower and recycling the remaining mixed water to said condensate.

2. A process according to claim 1, wherein a mineral acid is used for regeneration to remove surplus free alkali and/or salts which cause hardening and have been enriched in the cation exchange material and the regeneration eluate is removed from the system.

* * * * *